United States Patent [19]
Jagini

[11] Patent Number: 5,384,724
[45] Date of Patent: Jan. 24, 1995

[54] ELECTRONIC CIRCUIT AND METHOD FOR HALF ADDER LOGIC

[75] Inventor: Shyam S. Jagini, Secunderabad, India

[73] Assignee: Texas Instruments Incorporated, Dallas, Tex.

[21] Appl. No.: 755,199

[22] Filed: Sep. 5, 1991

[51] Int. Cl.⁶ .............................. G06F 7/50; G06F 7/00
[52] U.S. Cl. ........................... 364/770; 364/715.01; 364/787
[58] Field of Search ............... 364/715.01, 716, 770, 364/784, 786, 787, 788

[56] References Cited

U.S. PATENT DOCUMENTS

| | | | |
|---|---|---|---|
| 4,064,421 | 12/1977 | Gajski et al. | 364/715.1 |
| 4,153,939 | 5/1979 | Kudou | 364/770 |
| 4,286,320 | 8/1981 | Granville | 364/200 |
| 5,027,310 | 7/1991 | Dalrymple | 364/770 |

*Primary Examiner*—Roy N. Envall, Jr.
*Assistant Examiner*—Chuong D. Ngo
*Attorney, Agent, or Firm*—Alan C. McClure; Robert D. Marshall; Richard L. Donaldson

[57] ABSTRACT

An electronic half adder circuit wherein an entire word of either 16 or 32 bits is divided into stages, carry is rippled within each stage and look-ahead carry is computed between the stages, having a dual gate look-ahead carry circuit for propagating a look-ahead carry bit between said stages. This is also a processor system. The system includes: memory for storing program instructions; a processor coupled to the memory for receiving predetermined ones of the program instructions; the processor comprises: an arithmetic unit; control circuitry for controlling the arithmetic unit in response to selected ones of the predetermined program instructions; a counter coupled to the control circuitry comprising half adder circuitry wherein a dual gate look-ahead carry circuit for propagates a look-ahead carry bit between the stages. Additionally, this is a half adder circuit for a device formed on a semiconductor substrate wherein the carry look-ahead circuit has two gates so that the layout space on the semiconductor is minimized and the speed of a signal through the dual gate carry look-ahead circuit is increased. Other devices, systems and methods are also disclosed.

12 Claims, 7 Drawing Sheets

Fig.1

PRIOR ART

Fig. 2

PRIOR ART

Fig. 3

PRIOR ART

ELECTRONIC CIRCUIT AND METHOD FOR
HALF ADDER LOGIC (C) Copyright, 1991 Texas Instruments Incorporated. A portion of the disclosure of this patent document contains material which is subject to copyright and mask work protection. The copyright and mask work owner has no objection to the facsimile reproduction by anyone of the patent document or the patent disclosure, as it appears in the Patent and Trademark Office patent file or records, but otherwise reserves all copyright and mask work rights whatsoever.

FIELD OF THE INVENTION

This invention generally relates to an improved electronic circuit and method for half adder logic.

BACKGROUND OF THE INVENTION

Incrementers, decrementers and prioritizers which are based on half adder type of logic are widely used in the design of microprocessors, microcontrollers and other digital control systems. These elements based on 'ripple carry' consume fewer gates and cost less area but can involve large amounts of propagation delays. Fast carry look-ahead logic has been incorporated into these elements in applications which demand lesser propagation delays or faster operation. The look-ahead logic propagates the carry input signal of a stage to the carry output of the stage when all the primary data inputs of the stage are 'HIGH' for the incrementer and all the primary data inputs of that stage are 'LOW' for the decrementer. Since the propagation delay through the look-ahead carry signal is independent of the ripple delay within the stages the entire circuit operates faster.

Figure 1:
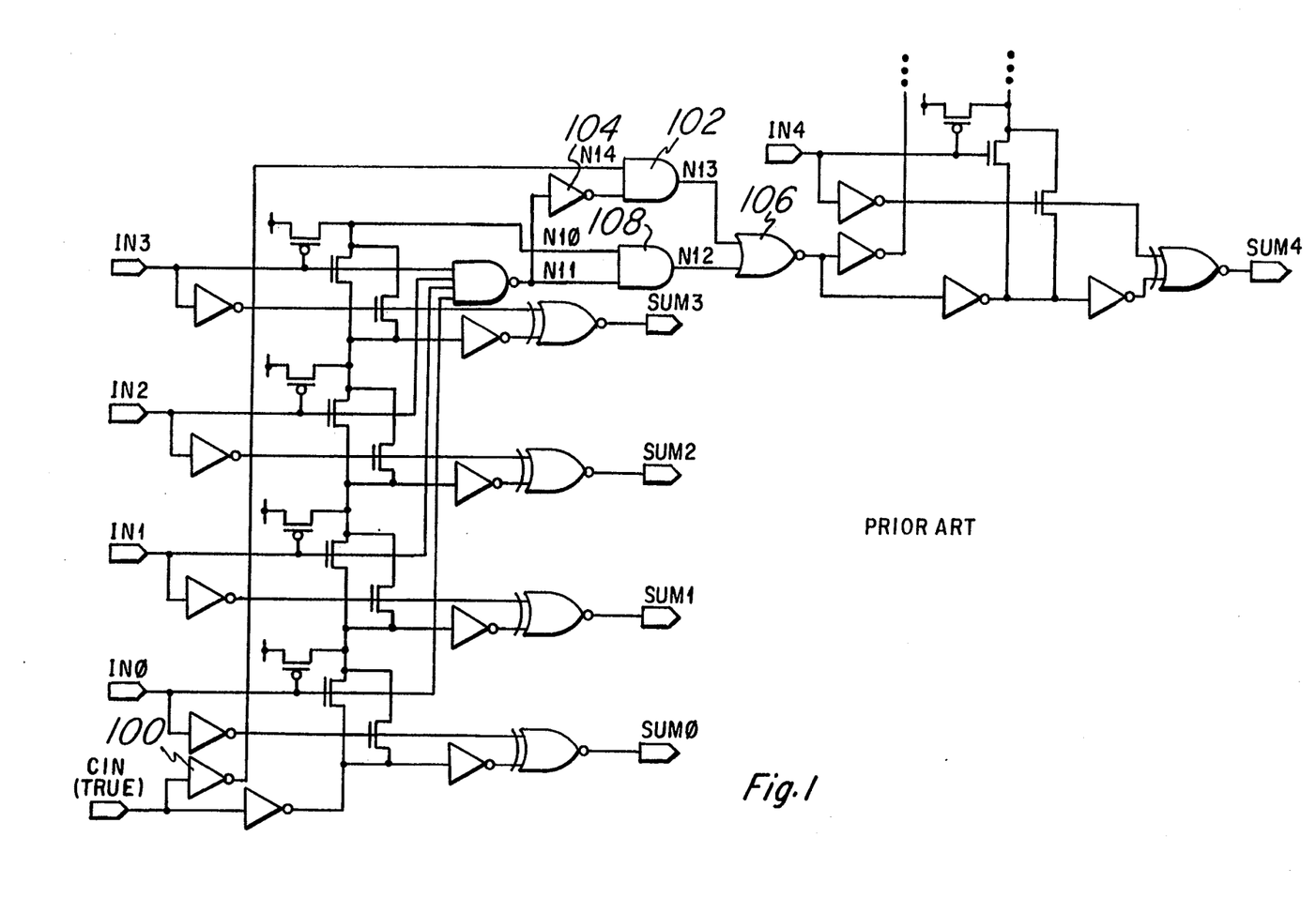
FIG. 1 is a block diagram of currently used carry look-ahead logic.

An example of currently used look-ahead carry logic is shown in FIG. 1 where the look-ahead carry logic for each stage consists of a 'n' input distributed NAND gate for a 'n' bit wide stage (the example in FIG. 1 is a four bit stage), two inverters and an AND-OR-INVERT circuit. Thus the carry look-ahead circuit of FIG. 1 is comprised of Inverter 100, AND-OR-INVERT circuit (AND gate 102, NOR gate 106, AND gate 108), Inverter 104, and NAND gate 110. There is a need for a new circuit and method to compute the carry which involves less propagation delay and uses fewer gates and hence facilitates a more competitive integrated circuit or system design. It is a technical advantage of this invention to improve the look-ahead carry signal for half adder type of elements using a fewer number of transistors and hence fewer gate delays.

Further technical advantages of the invention will become apparent to those of ordinary skill in the art having reference to the following specification, together with its drawings.

SUMMARY OF THE INVENTION

In general, one form of the invention is an electronic half adder circuit wherein an entire word of either 16 or 32 bits is divided into stages, carry is rippled within each stage and look-ahead carry is computed between the stages with a dual gate look-ahead carry circuit for propagating a look-ahead carry bit between said stages.

One technical advantage of this invention is that the look-ahead carry delay is independent of the ripple carry delay through a stage. The invention also eliminates the carry computation in the last bit of every stage.

Another technical advantage of this invention is that fewer gates are used to compute the carry and therefore the circuit operates faster because there is less propagation delay. Fewer gates also means less routing and hence minimized layout area of the data path of half adder circuits. Due to the wide usage of these elements in a system the result of this invention is significant savings in the substrate area of a semiconductor device.

Other circuits, systems and methods are also claimed.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Various processors and systems which can be improved according to the invention are described in the following U.S. patents and patent applications which are hereby incorporated herein by reference:

U.S. Pat. No. 4,577,282 shows a fixed point digital signal processors (DSPs) and systems. U.S. Pat. No. 4,912,636, and application Ser. No. 07/590,106 filed Sep. 28, 1990 show floating point DSPs. U.S. Pat. No. 4,908,748 shows circular addressing circuitry in a DSP.

U.S. Pat. Nos. 4,752,892, 4,718,024 shows graphics system processors (GSPs) and systems. U.S. Pat. No. 4,500,521 shows a microcontroller.

The adding or increment/decrement circuitry improvements are applicable in DSPs, GSPs, host microprocessors and microcomputers, math coprocessors and general purpose logic chips to which their advantages commend them.

Figure 2:
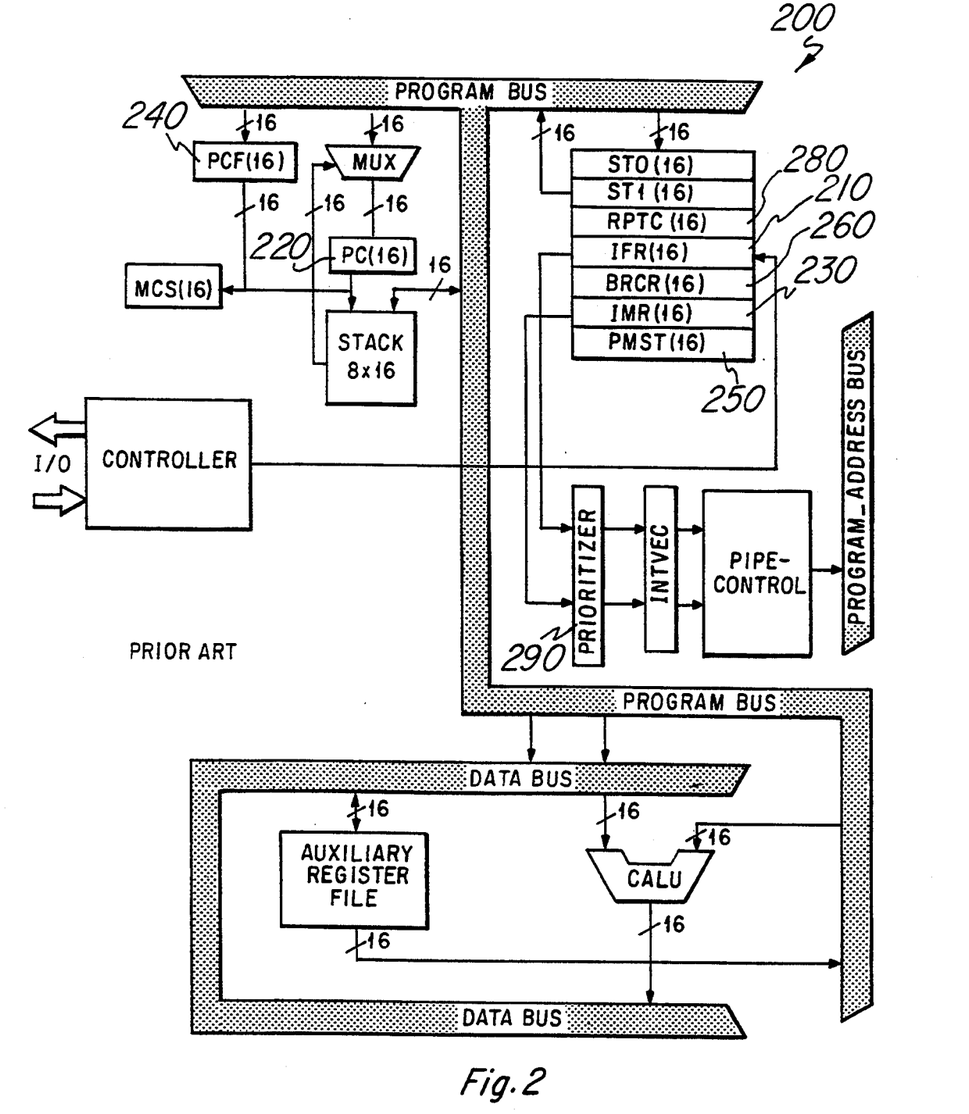
FIG. 2 is a block diagram of a processor system.

A processor is described in U.S. patent application Ser. No. 07/347,605 filed May 4, 1989 and hereby incorporated herein by reference. FIG. 2 shows a portion of circuitry redrawn from that later application. The preferred embodiment can be included in the incrementer circuitry of the blocks labeled PC (Program Counter) and PFC (PreFetch Counter), the decrementer circuitry of the blocks labeled BRCR (Block Repeat Counter Register), RPTC (RePeaT Counter), and the prioritizer circuitry of the block labeled Prioritizer.

The Program Counter 220 is a 16-bit program counter used to address program memory sequentially. The PC 220 contains the address of the next instruction to be fetched and its contents are updated following each instruction decode operation. The Prefetch Counter 240 is a 16-bit counter used to prefetch program instructions. The PFC 240 contains the address of the instruction currently being prefetched. It is updated when a new prefetch is initiated. The PFC 240 is also used to address program memory when using the block move, multiply-accumulate, and table read/write instructions and to address data memory when using the block move instruction.

The Block Repeat Counter Register 260 is a 16-bit memory-mapped counter register used to define the number of times the block is to be repeated. The Repeat Counter 280 is a 16-bit counter used to control the repeated execution of a single instruction.

The Prioritizer 290 is described in further detail below. The inputs to the Prioritizer are generated by the Interrupt Mask Register (IMR) 230 and the Interrupt Flag Register (IFR) 210. The IMR 230 is a 16-bit memory-mapped register used to mask interrupts. The IFR 210 is a 16-bit memory-mapped flag register used to latch the active-low interrupts.

Figure 3:
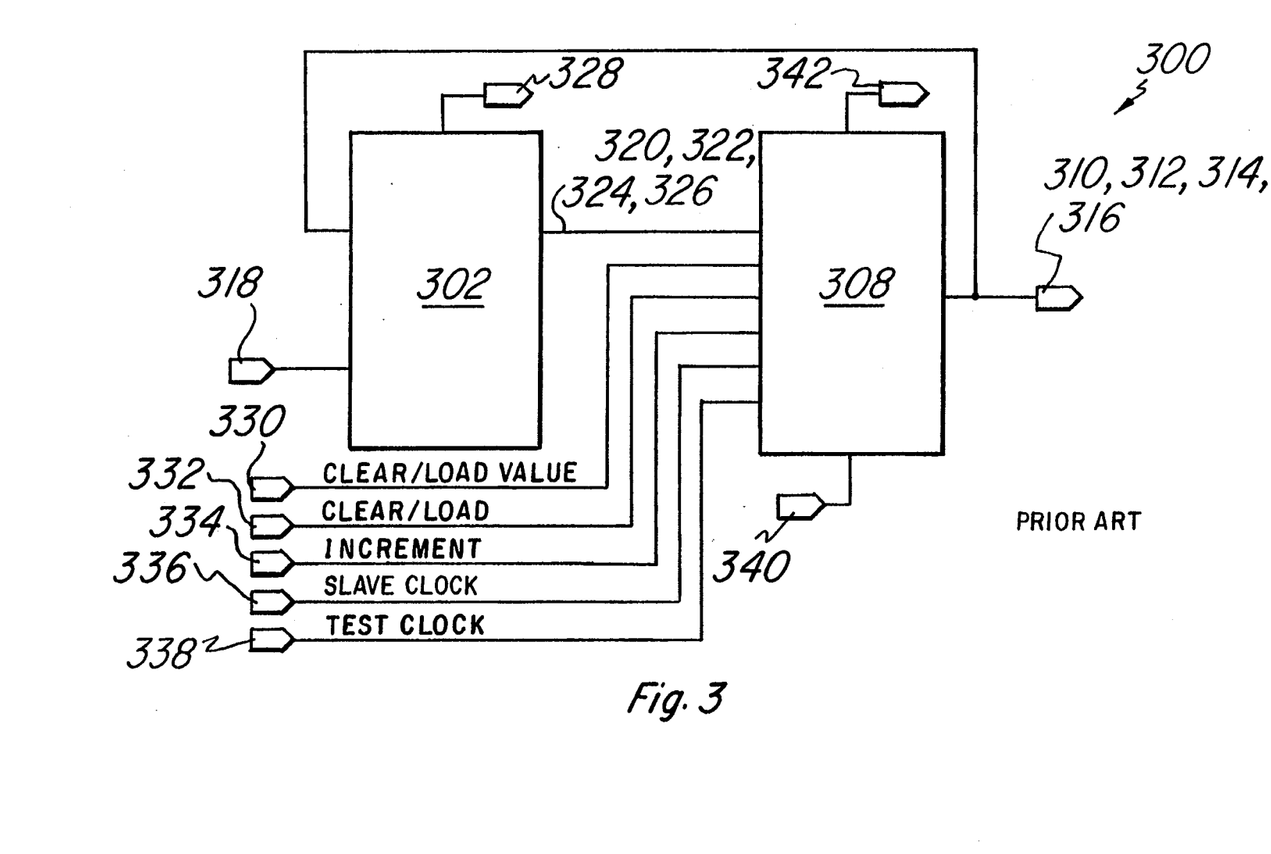
FIG. 3 is a block diagram of a 16-bit Incrementer.

FIG. 3 is a block diagram of a 4 bit incrementer/decrementer unit 300 of the preferred embodiment. Unit 300 is suitably replicated and located within any one or more of blocks 220, 240, 260, or 280 of FIG. 2. Unit 300 suitably has a single stage or a plurality of stages and may be an incrementing counter or a decrementing counter. For example, an incrementing counter is described.

FIG. 3 shows a four bit incrementing counter 300 which consists of a four bit incrementer 302 and a four bit register 308. The scan input for scanning the four bit register in the test/scan mode is 'scanin' 340 and the scan output for scanning the four bit register in the test/scan mode is 'scanout' 342. The inputs to the four bit register are 'din[0]' 330 which is the initial value loaded into the counter; 'din[1]' which is the four output bits from the incrementer 320, 322, 324, 326; 'vmt[0]' 332 which is the master clock to load the initial value into the incrementer counter register; 'vmt[1]' which is the master clock to load the incremented value from the incrementer into the register; 'lst' 336 which is the local slave clock; and 'ltt' 338 which is the local test clock.

The incrementer 302 has four input bits 'in' 310, 312, 314, 316; four output bits 'out' 320,322,324,326; 'carry-in' 318 the carry input for the incrementer; and 'carry-out' 328 the carry output of the incrementer.

By building the incrementer counter with a register 308 and incrementer 302, the register can be updated from the output of the incrementer with respect to the clock signal. As shown in FIG. 3 the output of the incrementer 302 is fed to the input of the register 308 and the output of the register 308 is in turn fed back to the input of the incrementer 302. The registers are designed with master/slave clocks; therefore, if the register is clocked with the master clock the register will be updated with the increment of the previous contents of the register. Since the output of the register is fed to the input of the incrementer, the incremented value at the output of the incrementer is available at the input of the register with some propagation delay. The register responds to this change in the output of the incrementer upon the next master cycle.

Figure 4:
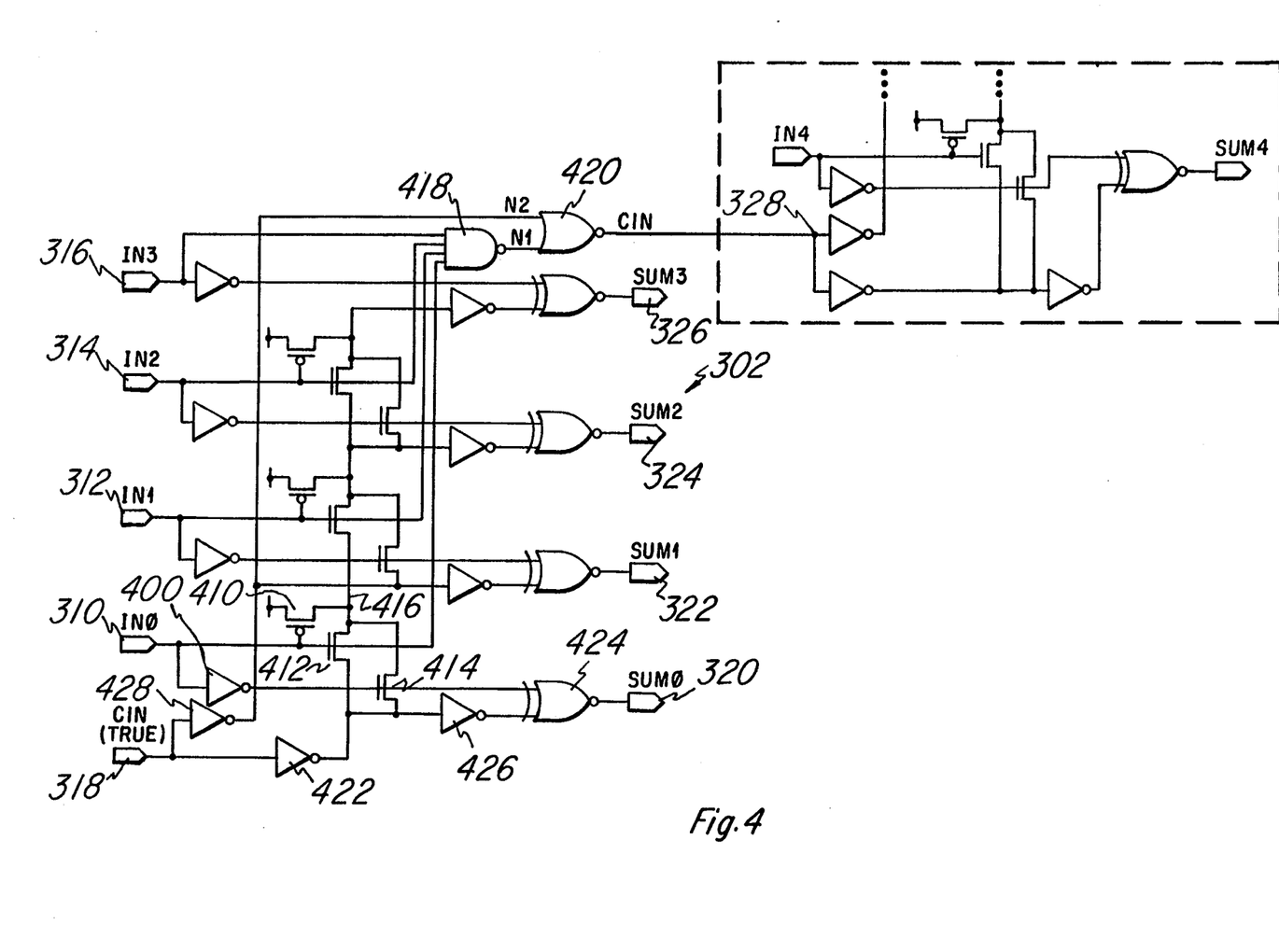
FIG. 4 is a schematic diagram of an incrementer circuit constructed according to the invention.

Look-ahead carry logic of FIG. 4 for the stage 302 of FIG. 3 propagates the carry input bit 318 of stage 302 to the carry input 328 of the next stage when all the primary data inputs of that stage are 'HIGH' for an incrementer configuration or if all the primary data inputs of that stage are 'LOW' for a decrementer configuration. Because the propagation delay through the look-ahead carry signal is independent of the ripple delay through the stage, incrementer stage 302 is a faster operating circuit.

FIG. 4 is a schematic diagram of the incrementer 302 of FIG. 3. The circuitry corresponding to the first bit includes data input bit 310, p-channel field effect transistor 410, n-channel field effect transistor 412, and p-channel field effect transistor 414. Input 310 is connected to the gate of p-channel field effect transistor 410 and the gate of n-channel transistor 412. Input 310 is also connected to the gate of p-channel transistor 414 through Inverter 400. One output of transistor 410 is connected to Vdd and the other output is connected to both an output of transistor 412 and an output of p-channel transistor 414. The other output of transistor 412 is connected to carry input 318 through Inverter 422. Incrementation is performed based on data input bit 310 and carry input 318. This circuitry outputs a sum bit on 320 and a carry ripple bit on line 416. The sum bit 'sum0' is generated by an exclusive-NOR gate 424. A first input of XNOR 424 is fed by inverter 400. A second input of XNOR 424 is fed by an inverter 426 which has an input fed by inverter 422.

A truth table for the incrementer logic of this example is shown in Table 1. By reference to FIG. 4 and truth table 1 the operation of the incrementer logic of FIG. 4 becomes apparent. In case 1 of truth table 1 where data bit 310 (in0) and carry input 318 are both logic '0', transistor 410 is 'ON' and transistors 412 and 414 are 'OFF'. Therefore data sum bit 320 presents a logic '0' as its output and carry ripple 416 (active low) presents a logic '1'. Thus, the incrementer of FIG. 4 correctly implements case 1 of truth table 1. When data input 310 and carry input 318 are '0' their sum yields a '0' and carry ripple 416 is not activated.

The operation of the incrementer logic of FIG. 4 in case 4 of truth table 1 where data input 310 and carry input 318 both have the values of '1' is now explained. When data input 310 and carry input 318 are both '1', transistor 410 is 'OFF' and transistors 412 and 414 are both 'ON'. Thus data sum bit 320 presents a logic '0' as its output and carry ripple presents a logic '0'. Thus, the incrementer of FIG. 4 correctly implements case 4 of truth table 1. When data input 310 and carry input 318 are '1' their sum yields a '0' and carry ripple 416 is activated.

The incrementer logic of FIG. 4 similarly operates for the other cases of truth table 1.

The components of the dual gate look-ahead logic for the incrementer in FIG. 4. are the NAND gate 418 and the NOR gate 420. The look-ahead carry logic for stage 302 basically propagates the carry input signal on line 318 of the stage to the carry output signal of the stage when all the primary data inputs of that stage are 'HIGH'. This delay is independent of the ripple carry delay through the same stage. When inputs in0, in1, in2, and in3 are 1 the four inputs to NAND gate 418 are 1 and therefore the output of the NAND gate 418 is 0. Hence node N1 is 0. When the carry input signal cin 318 is 1 node N2 is also a 0 due to inverter 428. When nodes N1 and N2 are 0 the output of NOR gate 420 is 1. If any of the inputs are not 1 the output of NAND gate 418 will be 1 and thus the output of NOR gate 420 will be 0 regardless of the values of carry input cin. The output of NOR gate 420 will also be 0 if carry input cin is 0 regardless of the values of the inputs.

The currently used look-ahead carry logic for each stage as shown in FIG. 1 consists of a 'n' input distributed NAND gate 110 for a 'n' bit wide stage (the example in FIG. 1 is a four bit stage), two inverters and an AND-OR-INVERT circuit. Functionally, the carry look-ahead circuit of FIG. 1 is comprised of Inverter 100, AND gate 102, Inverter 104, NOR gate 106, AND gate 108, and NAND gate 110. Stepping through FIG. 1 the logic previously used to perform the look-ahead carry function becomes clear. NAND gate 110 will output a value of 1 on node N11 unless all inputs (in0, in1, in2, and in3) are all 1's in which case the output of NAND gate 110 is 0. Node N11 feeds AND gate 108 and Inverter 104. If the ripple carry bit (node N10) is 1 and Node N11 is 1 then the output N12 of AND gate 108 is 1, otherwise it is 0. If node N11 and the carry input cin are 0 then the output N13 of AND gate 102 is 1 (node N14 is 1 in this case), otherwise node N13 is 0. If either N12 or N13 are 1 then the output of NOR gate 106 is 0 otherwise the output is 1. In operation, this circuit will propagate a carry look-ahead to the next stage when the carry input is 1 and all of the input bits (in0,in1,in2,in3) are 1. When all of the input bits are 1 the output of NAND gate 110 is 0. Regardless of the value of node N10 the output of AND gate 108 will be 0. Since the carry input is 1 the output of AND gate 102 will also be 0 regardless of the value of node N11. Since N12 and N13 are both 0 the output of NOR gate 106 is 1. The result is that the carry look-ahead has been propagated to the input of the next stage. The embodiment as shown in FIG. 4 accomplishes the same operation outlined above for FIG. 1 using less gates. A key difference between the circuits of FIG. 1 and FIG. 4 is that the inputs to the NOR gate in FIG. 1 are not independent of each other while the inputs to the NOR gate 420 of FIG. 4 are independent of each other. Specifically, node N11 of FIG. 1 feeds both AND gates 102 and 108 and therefore node N11 influences both inputs to NOR gate 106. On the other hand the inputs to the NOR gate 420 of FIG. 4 are independent of each other and the output of NAND gate 418 influences one not both input nodes of the NOR gate 420. When the inputs (in0, in1, in2, in3) of the circuit shown in FIG. 4 are 1 the output of NAND gate 418 is 0. Node N2 will also be 0 when the carry input is 1 because the carry input value is inverted when the signal passes through Inverter gate 428. Since nodes N1 and N2 are both 0, the output of NOR gate 420 is 1 and the look-ahead carry signal is propagated to the next stage. Since this circuit accomplishes the same results with fewer gates, a savings in semiconductor substrate area and an increase in circuit speed is realized.

Figure 5:
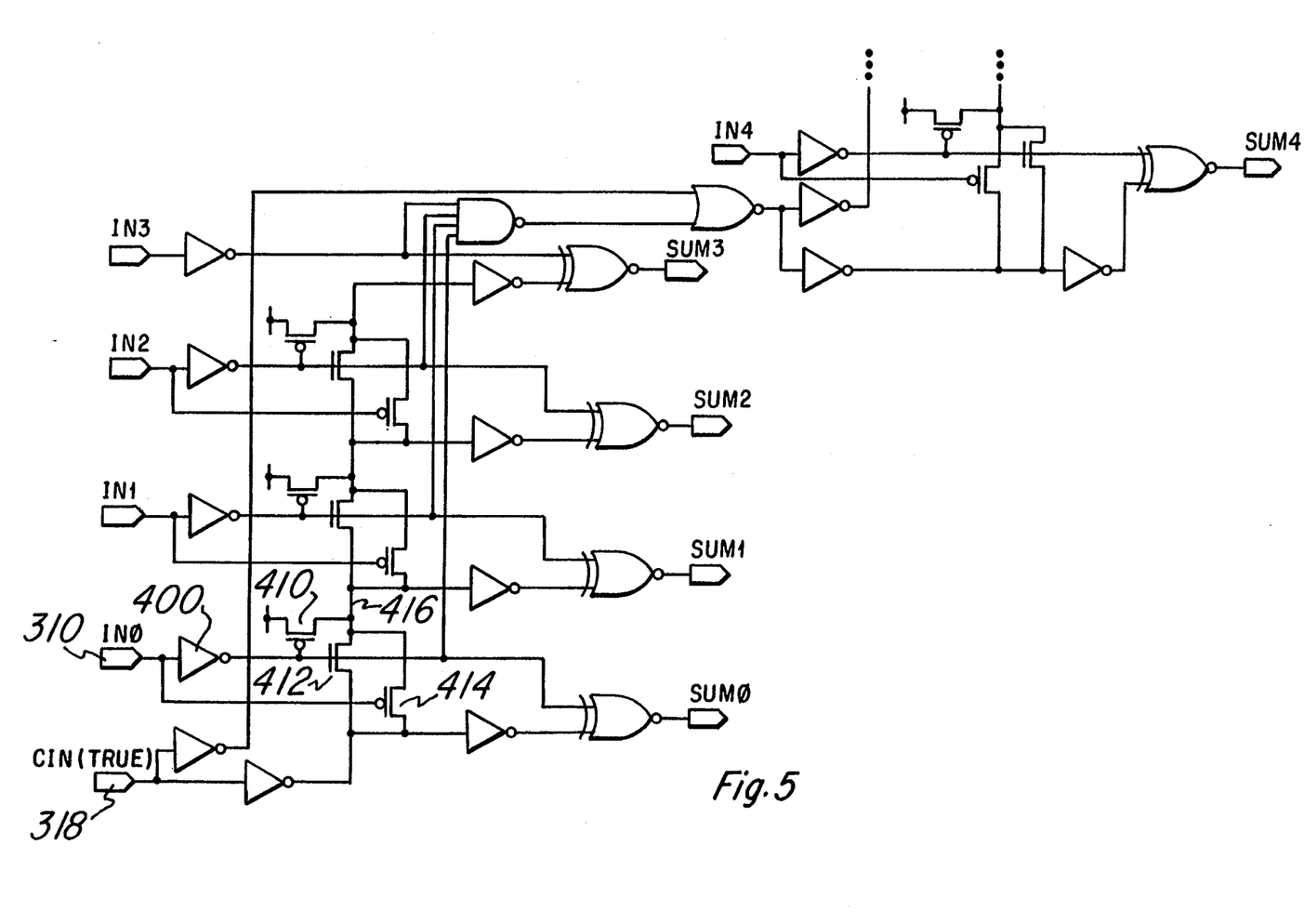
FIG. 5 is a schematic diagram of a decrementer circuit constructed according to the invention.

The decrementer shown schematically in FIG. 5 incorporates the same look-ahead carry logic of the incrementer circuit explained above. The circuitry of FIG. 5 works as a decrementer because of the placement of inverter 400 between in0 and the gate of p-channel transistor 412. Truth table 2 further documents the logic of FIG. 5. The look-ahead carry logic for the stage basically propagates the carry input signal of the stage to the carry output signal of the stage when all the primary data inputs of that stage are 'LOW'. This delay is independent of the ripple carry delay through the same stage.

The CPU described in the incorporated application supports sixteen user-maskable interrupts (INT16-INT1). Interrupts can be generated externally or they can also be generated internally by the serial ports(-RINT and XINT), by the timer (TINT), and by the software interrupt (TRAP) instruction. Since more than one interrupt can be active at the sane time, the CPU needs to prioritize the interrupts, in order to respond to the interrupt. The interrupt priorities are set so that reset (RS) has the highest priority and serial port interrupt has the lowest priority. When an interrupt occurs, a flag is activated in the 16-bit interrupt flag register (IFR). Each interrupt is stored in the IFR until it is recognized by the CPU. A logic 1 in an IFR position indicates a pending interrupt. An interrupt flag is automatically cleared when the corresponding interrupt trap is taken. When the CPU accepts the interrupt, it jams the instruction bus with an interrupt instruction. This instruction forces the PC to the appropriate interrupt vector address and fetches the soft vector from the interrupt vector address location. Vector relative locations and priorities for all internal and external interrupts are shown in Table 3. These interrupt vector addresses are relative addresses. These interrupt vectors can be mapped to the beginning of any 2K-word page in program memory. The interrupt vector address is generated by concatenating the IPTR bits of the PMST register 250 with the interrupt vector number (1-16) shifted by one. The IPTR is the interrupt pointer and is the five bits pointing to the 2K page where the interrupt vectors currently reside in the system. Only user-maskable interrupts (INT1-INT16) are prioritized by the prioritizer. The reset (RS) and the Non-maskable Interrupt (NMI) have the higher priority than the sixteen user-maskable interrupts. The output of the prioritizer for each interrupt is shown in Table 4.

As an example of how the prioritizer works suppose the INT1 interrupt is active (i.e. bit 0 in the IFR is 1) and the corresponding interrupt is not masked in the IMR. The prioritizer generates the output vector according to Table 4. As seen from the vector for the interrupt INT1 in Table 4, only bit 0 is '1' and all other bits are zeros. The output bit in the bit 0 position evaluates to '1' and the carry bit from bit 0 to bit 1 is deactivated and propagates accordingly to all the bits to generate zeros in the rest of the fifteen bit positions. The prioritizer is not exactly a half-adder type of operation but is similar in the sense of the carry-path logic. The carry output of any bit position is 'active' only if the 'output' bits of all the lower order bit positions are zero and the primary carry input of the prioritizer is active.

Figure 6:
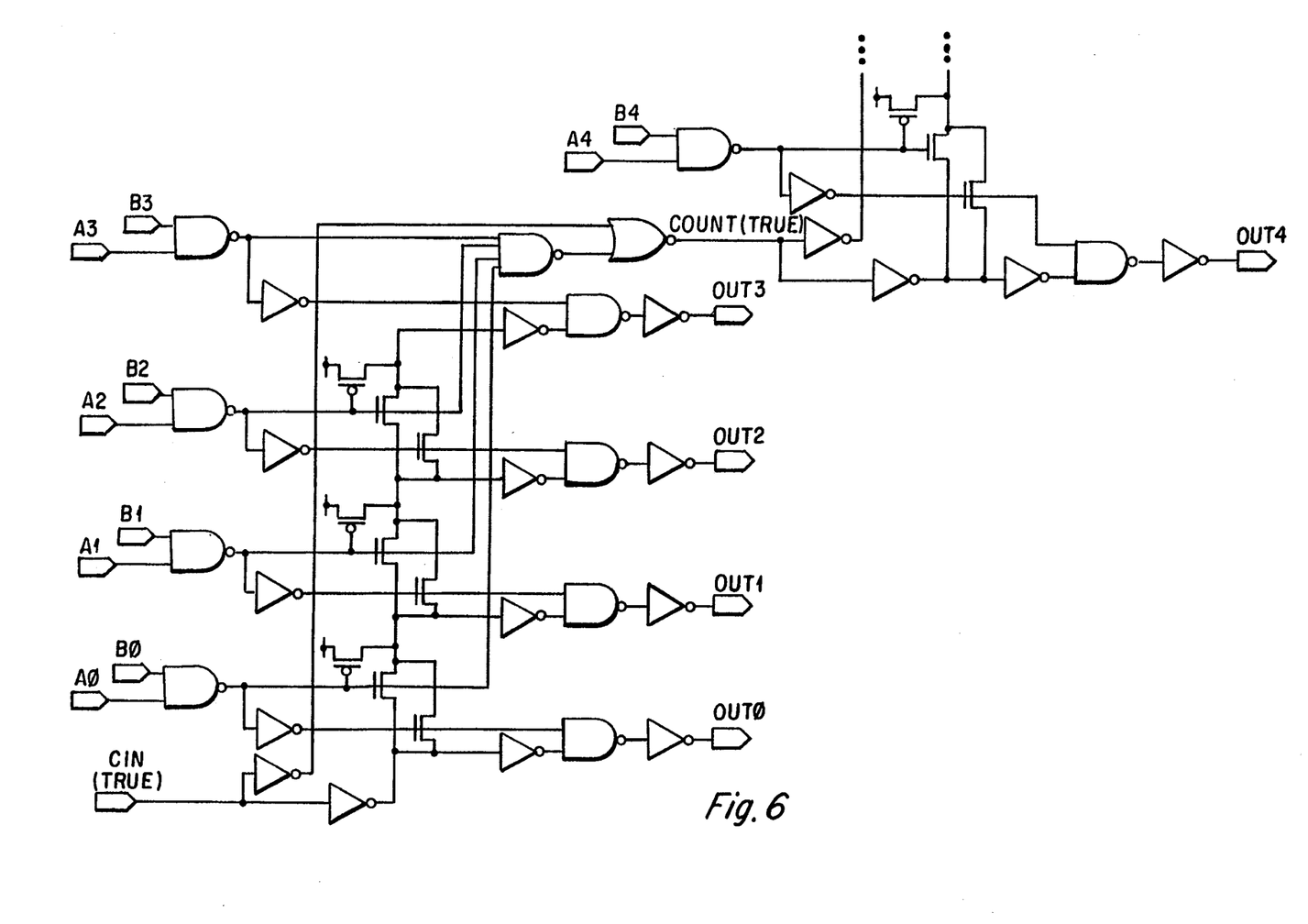
FIG. 6 is a schematic diagram of a prioritizer circuit constructed according to the invention.

The prioritizer is shown schematically in FIG. 6. The circuitry of FIG. 6 works as a prioritizer because it performs priority decoding of the interrupts received by the Central Processing Unit and stored in the Interrupt Flag Register, 210. When an interrupt occurs, a flag is activated in the interrupt flag register (IFR). Each interrupt is stored in the IFR until it is recognized by the CPU. A logic 1 in an IFR bit position indicates a pending interrupt. A memory-mapped interrupt mask register (IMR) is used for masking external and internal interrupts. A 1 in bit positions 15 through 0 of the IMR enables the corresponding interrupt. The IMR is accessible with both read and write operations. When the IMR is read, any unused bits are read as ones because all unused interrupts are pulled on-chip. All interrupts are disabled when the carry input to the prioritizer is 'LOW'. When the carry input is 'HIGH', interrupts are either enabled or disabled depending on the corresponding bit in the IMR. When an interrupt is recognized, an interrupt vector is generated by the prioritizer and an appropriate interrupt acknowledge signal is generated using the carry output of the prioritizer. The interrupt vector is used to interrupt the processor. The interrupt vector created by the outputs out0 through out15 has all bits except one set 'LOW'. The bit set 'HIGH' is the bit whose interrupt is currently recognized. Thus, each bit in the prioritizer has two inputs 'a' and 'b', a carry output 'cout' and an output 'out'. The interrupt for any bit is recognized if the output 'out' for the corresponding bit is 'HIGH'. Output 'out' for any bit is 'HIGH' only if the corresponding two inputs 'a' and 'b' are 'HIGH' and its carry input is active. The carry input of the next stage of the prioritizer is active, if none of the interrupts in the stage are recognized either because they are disabled in the IMR or because the interrupts are not active according to the IFR. Table 5 further documents the logic of FIG. 6.

Figure 7:
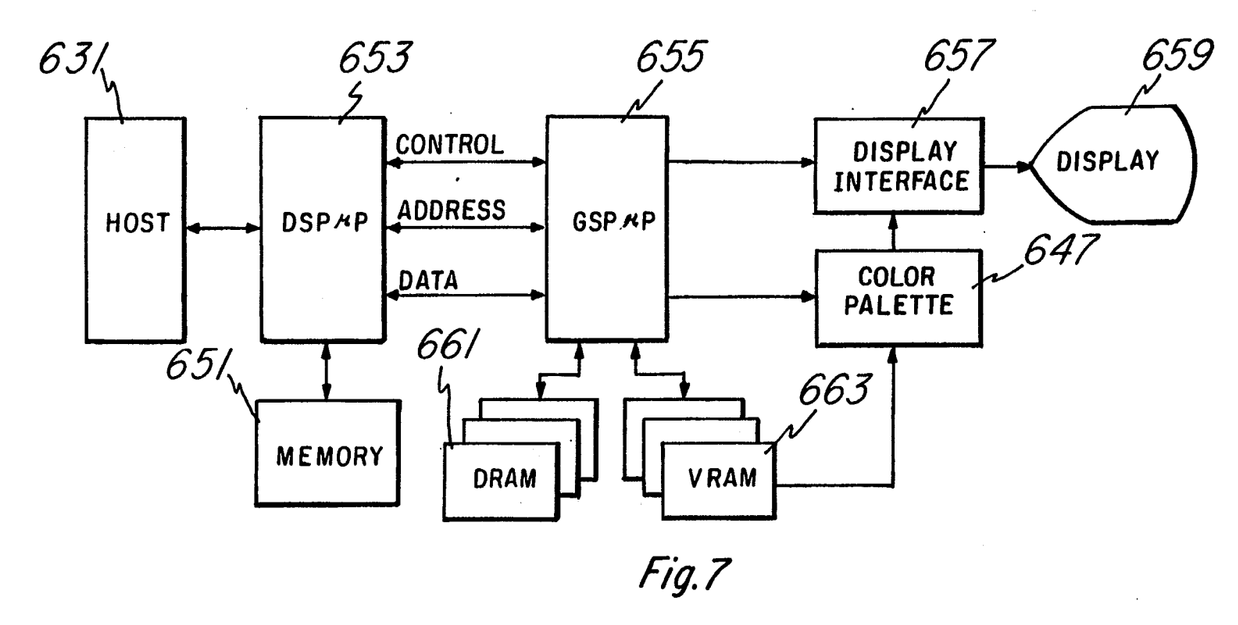
FIG. 7 is a block diagram of a system for improved graphics, image and video processing which incorporates the invention.

FIG. 7 shows a system redrawn from the above mentioned application Ser. No. 07/347,605 which incorporates the invention. In FIG. 7, the host 631 supplies signals to a first device 11 operating as a DSP microprocessor 653. DSP 653 is supported by memory 651 including PROM, EPROM and SRAM static memory. Control, address and data information are supplied by two-way communications paths between DSP 653 and a second device 11 operating as a GSP (graphics signal processor) 655. GSP 655 drives both color palette 647. Display CRT 659 is driven by display interface 657. It is to be understood that the devices 11 and the system of FIG. 7 in general is operated at an appropriate clock rate suitable to the functions required. Device 11 is fabricated in micron level and sub-micron embodiments to support processing speeds needed for particular applications. Applications for this system includes workstations, computer interfaces, television products and high definition television (HDTV) products.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

TABLE 1

Truth Table for bit '0' of the Incrementer

| cin | in0 | sum0 | carry ripple (active Low) |
|-----|-----|------|---------------------------|
| 0 | 0 | 0 | 1 |
| 0 | 1 | 1 | 1 |
| 1 | 0 | 1 | 1 |
| 1 | 1 | 0 | 0 |

TABLE 2

Truth Table for bit '0' of the Decrementer

| cin | in0 | sum0 | carry ripple (active Low) |
|-----|-----|------|---------------------------|
| 0 | 0 | 0 | 1 |
| 0 | 1 | 1 | 1 |
| 1 | 0 | 1 | 0 |
| 1 | 1 | 0 | 1 |

TABLE 3

Interrupt Locations & Priorities

| Name † | Location Dec | Hex | Priority | Function |
|--------|-----|-----|----------|----------|
| $\overline{RS}$ | 0 | 0 | 1 highest | reset signal |
| $\overline{INT1}$ | 2 | 2 | 3 | user interrupt #1 |
| $\overline{INT2}$ | 4 | 4 | 4 | user interrupt #2 |

TABLE 3-continued

Interrupt Locations & Priorities

| Name † | Location Dec | Hex | Priority | Function |
|--------|-----|-----|----------|----------|
| $\overline{INT3}$ | 6 | 6 | 5 | user interrupt #3 |
| $\overline{INT4}$ | 8 | 8 | 6 | user interrupt #4 |
| $\overline{INT5}$ | 10 | A | 7 | user interrupt #5 |
| $\overline{INT6}$ | 12 | C | 8 | user interrupt #6 |
| $\overline{INT7}$ | 14 | E | 9 | user interrupt #7 |
| $\overline{INT8}$ | 16 | 10 | 10 | user interrupt #8 |
| $\overline{INT9}$ | 18 | 12 | 11 | user interrupt #9 |
| $\overline{INT10}$ | 20 | 14 | 12 | user interrupt #10 |
| $\overline{INT11}$ | 22 | 16 | 13 | user interrupt #11 |
| $\overline{INT12}$ | 24 | 18 | 14 | user interrupt #12 |
| $\overline{INT13}$ | 26 | 1A | 15 | user interrupt #13 |
| $\overline{INT14}$ | 28 | 1C | 16 | user interrupt #14 |
| $\overline{INT15}$ | 30 | 1E | 17 | user interrupt #15 |
| $\overline{INT16}$ | 32 | 20 | 18 | user interrupt #16 |
| TRAP | 34 | 22 | N/A | TRAP instruction vector |
| $\overline{NMI}$ | 36 | 24 | 2 | non-maskable interrupt |

TABLE 4

Prioritize output for each interrupt

| Interrupt | Prioritizer Output xxxxxx9876543210 543210xxxxxxxxxx MSB   LSB | '1' bit position (DECIMAL) | Intr Number (DECIMAL) | Intr Vector (HEX) |
|-----------|-------------------------------|------------|------------|------|
| INT1_  | 0000000000000001 | 00 | 01 | 02 |
| INT2_  | 0000000000000010 | 01 | 02 | 04 |
| INT3_  | 0000000000000100 | 02 | 03 | 06 |
| INT4_  | 0000000000001000 | 03 | 04 | 08 |
| INT5_  | 0000000000010000 | 04 | 05 | 0A |
| INT6_  | 0000000000100000 | 05 | 06 | 0C |
| INT7_  | 0000000001000000 | 06 | 07 | 0E |
| INT8_  | 0000000010000000 | 07 | 08 | 10 |
| INT9_  | 0000000100000000 | 08 | 09 | 12 |
| INT10_ | 0000001000000000 | 09 | 10 | 14 |
| INT11_ | 0000010000000000 | 10 | 11 | 16 |
| INT12_ | 0000100000000000 | 11 | 12 | 18 |
| INT13_ | 0001000000000000 | 12 | 13 | 1A |
| INT14_ | 0010000000000000 | 13 | 14 | 1C |
| INT15_ | 0100000000000000 | 14 | 15 | 1E |
| INT16_ | 1000000000000000 | 15 | 16 | 20 |

TABLE 5

Truth Table for bit '0' of the Prioritizer

| a0 | b0 | cin | out0 | carry ripple (active Low) |
|----|----|-----|------|---------------------------|
| 0 | 0 | 0 | 0 | 1 |
| 0 | 0 | 1 | 0 | 0 |
| 0 | 1 | 0 | 0 | 1 |
| 0 | 1 | 1 | 0 | 0 |
| 1 | 0 | 0 | 0 | 1 |
| 1 | 0 | 1 | 0 | 0 |
| 1 | 1 | 0 | 0 | 1 |
| 1 | 1 | 1 | 1 | 1 |

What is claimed is:

1. An N bit incrementer circuit comprising:

a set of N input terminals, each input terminal receiving a corresponding bit signal of an N bit number to be incremented;

a carry input terminal for receiving a carry input signal to a least significant bit of said N bit number to be incremented;

a set of N output terminals, each output terminal generating a corresponding incremented bit of said N bit number to be incremented;

a carry output terminal for generating a carry output signal from a most significant bit of each N bit number to be incremented;

a set of N-1 half adder circuits, one half adder circuit for each bit of said N bit number to be incremented except for said most significant bit, each half adder circuit connected to a corresponding input terminal for receiving a corresponding bit input signal and receiving a ripple carry signal, a least significant half adder circuit connected to said carry input terminal for receiving a ripple carry signal, each other half adder circuit connected to a prior half adder circuit for receiving a ripple carry signal from said prior half adder circuit, each half adder circuit including a sum circuit connected to a corresponding output terminal for forming an arithmetic sum on said corresponding output terminal from said corresponding bit signal and said received ripple carry signal, a ripple carry circuit connected to said corresponding input terminal for forming a ripple carry signal for supply to a next half adder circuit from said corresponding bit input signal and said received ripple carry signal;

a most significant bit half adder circuit connected to a most significant bit input terminal for receiving a most significant bit input signal and receiving a ripple carry signal from a prior half adder circuit, said most significant half adder circuit including a sum circuit connected to a corresponding output terminal for forming an arithmetic sum on said corresponding output terminal from said corresponding bit signal and said received ripple carry signal, said most significant bit half adder circuit having no ripple carry circuit;

a carry look-ahead circuit including
an inverter having an input connected to said carry input terminal and an output
a NAND gate having N inputs, each input connected to a corresponding input terminal, and an output
a NOR gate having a first input connected to said output of said inverter and a second input connected to said output of said NAND gate and an output connected to said carry output terminal.

2. The N bit incrementer circuit as claimed in claim 1, further comprising:

an N bit register having a set of inputs connected to corresponding output terminals, and a set of outputs connected to corresponding input terminals, said N bit register storing therein data supplied to said set of inputs and recalling stored data for supply to said input terminals for incrementing.

3. The N bit decrementer circuit as claimed in claim 1, further comprising:

an N bit register having a set of inputs connected to corresponding output terminals, and a set of said outputs connected to corresponding input terminals, said N bit register storing therein data supplied to said set of inputs and recalling stored data for supply to said input terminals for decrementing.

4. An N bit incrementer circuit comprising:

a set of N input terminals, each input terminal receiving a corresponding bit signal of an N bit number to be incremented;

a carry input terminal for receiving a carry input signal to a least significant bit of said N bit number to be incremented;

a set of N output terminals, each output terminal generating a corresponding incremented bit of said N bit number to be incremented;

a carry output terminal for generating a carry output signal from a most significant bit of said N bit number to be incremented;

a plurality of incrementer stages, each incrementer stage having M bits where M<N, each incrementer stage connected to corresponding input terminals and output terminals and having a stage carry input and a stage carry output, said stage carry input of a least significant incrementer stage connected to said carry input terminal, said stage carry input of other incrementer stages connected to said stage carry output of a prior incrementer stage and said stage carry output of a most significant incrementer stage connected to said carry output terminal, each incrementer stage including a set of M−1 half adder circuits, one half adder circuit for each corresponding bit of said N bit number to be incremented except for a most significant bit of said incrementer stage, each half adder circuit connected to a corresponding input terminal for receiving a corresponding bit input signal and receiving a ripple carry signal, a least significant half adder circuit of each incrementer stage connected to said stage carry input for receiving a ripple carry signal, said other half adder circuit connected to a prior half adder circuit for receiving a ripple carry signal from said prior half adder circuit, each half adder circuit having a sum circuit connected to a corresponding output terminal for forming an arithmetic sum on said corresponding output terminal from said corresponding bit signal and said received ripple carry signal, a ripple carry circuit connected to said corresponding input terminal for forming a ripple carry signal for supply to a next half adder circuit from said corresponding bit input signal and said received ripple carry signal;

a most significant bit half adder circuit connected to a most significant bit input terminal of said incrementer stage for receiving a most significant bit input signal and receiving a ripple carry signal from a prior half adder circuit, said most significant half adder circuit having a sum circuit connected to a corresponding output terminal for forming an arithmetic sum on said corresponding output terminal from said corresponding bit signal and said received ripple carry signal, said most significant bit half adder circuit having no ripple carry circuit;

a carry look-ahead circuit having
an inverter having an input connected to said stage carry terminal and an output, a NAND gate having N inputs, each input connected to a corresponding input terminal of said incrementer stage, and an output a NOR gate having a first input connected to said output of said inverter and a second input connected to said output of said NAND gate and an output connected to said state carry output.

5. The N bit incrementer circuit as claimed in claim 4, further comprising:

an N bit register having a set of inputs connected to corresponding output terminals, and a set of outputs connected to corresponding input terminals, said N bit register storing therein data supplied to said set of inputs and recalling stored data for supply to said input terminals for incrementing.

6. The N bit decrementer circuit as claimed in claim 4, further comprising:

an N bit register having a set of inputs connected to corresponding output terminals, and a set of said outputs connected to corresponding input terminals, said N bit register storing therein data supplied to said set of inputs and recalling stored data for supply to said input terminals for decrementing.

7. A computer system comprising:

a memory for storing program instructions; and a processor coupled to said memory for executing program instructions recalled from said memory, said processor including a program counter having stored therein an address for a next instruction to be recalled from said memory, an incrementer connected to said program counter for incrementing the address stored in said program counter to the a next sequential address, said incrementer having a set of N input terminals, each input terminal receiving a corresponding bit signal of said address stored in said program counter;

a carry input terminal for receiving a carry input signal to a least significant bit of said N bit number to be incremented;

a set of N output terminals, each output terminal generating a corresponding incremented bit of said address to be incremented;

a carry output terminal for generating a carry output signal from a most significant bit of said N bit number to be incremented;

a plurality of incrementer stages, each incrementer stage having M bits where M<N, each incrementer stage connected to corresponding input terminals and output terminals and having a stage carry input and a stage carry output, said stage carry input of a least significant incrementer stage connected to said carry input terminal, said stage carry input of other incrementer stages connected to said stage carry output of a prior incrementer stage and said stage carry output of a most significant incrementer stage connected to said carry output terminal, each incrementer stage having a set of M−1 half adder circuits, one half adder circuit for each corresponding bit of said N bit number to be incremented except for a most significant bit of said incrementer stage, each half adder circuit connected to a corresponding input terminal for receiving a corresponding bit input signal and receiving a ripple carry signal, a least significant half adder circuit of each incrementer stage connected to said stage carry input for receiving a ripple carry signal, each other half adder circuit connected to a prior half adder circuit for receiving a ripple carry signal from said prior half adder circuit, each half adder circuit including a sum circuit connected to a corresponding output terminal for forming an arithmetic sum on said corresponding output terminal from said corresponding bit signal and said receiving ripple carry signal, a ripple carry circuit connected to said corresponding input terminal for forming a ripple carry signal for supply to a next half adder circuit from said corresponding bit input signal and said received ripple carry signal;

a most significant bit half adder circuit connected to a most significant bit input terminal of said incrementer stage for receiving a most significant bit input signal and receiving a ripple carry signal from a prior half adder circuit, said most significant half adder circuit including a sum circuit connected to a corresponding output terminal for forming an arithmetic sum on said corresponding output terminal from said corresponding bit signal and said received ripple carry signal, said most significant bit half adder circuit having no ripple carry circuit;

a carry look-ahead circuit including an inverter having an input connected to said stage carry terminal and an output, a NAND gate having N inputs, each input connected to a corresponding input terminal of said incrementer stage, and an output a NOR gate having a first input connected to said output of said inverter and a second input connected to said output of said NAND gate and an output connected to said stage carry output.

8. An N bit decrementer circuit comprising:

a set of N input terminals, each input terminal receiving a corresponding bit signal of an N bit number to be decremented;

a borrow input terminal for receiving a borrow input signal to a least significant bit of said N bit number to be decremented;

a set of N output terminals, each input terminal generating a corresponding decremented bit of said N bit number to be decremented;

a borrow output terminal for generating a borrow output signal from a most significant bit of said N bit number to be decremented;

a set of N−1 half adder circuits, one half adder circuit for each bit of said N bit number to be decremented except for said most significant bit, each half adder circuit connected to a corresponding input terminal for receiving a corresponding bit input signal and receiving a ripple borrow signal, a least significant half adder circuit connected to said borrow input terminal for receiving a ripple borrow signal, each other half adder circuit connected to a prior half adder circuit for receiving a ripple borrow signal from said prior half adder circuit, each half adder circuit including a sum circuit connected to a corresponding output terminal for forming an arithmetic sum on said corresponding output terminal from said corresponding bit signal and said received ripple borrow signal, a ripple borrow circuit connected to said corresponding input terminal for forming a ripple borrow signal for supply to a next half adder circuit from said corresponding bit input signal and said received ripple borrow signal;

a most significant bit half adder circuit connected to a most significant bit input terminal for receiving a most significant bit input signal and receiving a ripple borrow signal from a prior half adder circuit, said most significant half adder circuit including a sum circuit connected to a corresponding output terminal for forming an arithmetic sum on said corresponding output terminal from said corresponding bit signal and said received ripple borrow signal, said most significant bit half adder circuit having no ripple carry circuit;

a borrow look-ahead circuit including
   an inverter having an input connected to said borrow input terminal and an output,
   a set of N bit inverters, each inverter having an input connected to a corresponding input terminal and an output,
   a NAND gate having N inputs, each input connected to said output of a corresponding bit inverter, and an output,
   a NOR gate having a first input connected to said output of said inverter and a second input connected to said output of said NAND gate and an output connected to said borrow output terminal.

9. An N bit decrementer circuit comprising:
a set of N input terminals, each input terminal receiving a corresponding bit signal of an N bit number to be decremented;
a borrow input terminal for receiving a borrow input signal to a least significant bit of said N bit number to be decremented;
a set of N output terminals, each input terminal generating a corresponding decremented bit of said N bit number to be decremented;
a borrow output terminal for generating a borrow output signal from a most significant bit of said N bit number to be decremented;
a plurality of decrementer stages, each decrementer stage having M bits where M<N, each decrementer stage connected to corresponding input terminals and output terminals and having a stage borrow input and a stage borrow output, said stage borrow input of a least significant decrementer stage connected to said borrow input terminal, said stage borrow input of other decrementer stages connected to said stage borrow output of a prior decrementer stage and said stage borrow output of a most significant decrementer stage connected to said borrow output terminal, each decrementer stage including
   a set of M−1 half adder circuits, one half adder circuit for each corresponding bit of said N bit number to be decremented except for a most significant bit of said decrementer stage, each half adder circuit connected to a corresponding input terminal for receiving a corresponding bit input signal and receiving a ripple borrow signal, a least significant half adder circuit of each decrementer stage connected to said stage borrow input for receiving a ripple borrow signal, each other half adder circuit connected to a prior half adder circuit for receiving a ripple borrow signal from said prior half adder circuit, each half adder circuit having
      a sum circuit connected to a corresponding output terminal for forming an arithmetic sum on said corresponding output terminal from said corresponding bit signal and said received ripple borrow signal,
      a ripple borrow circuit connected to said corresponding input terminal for forming a ripple borrow signal for supply to a next half adder circuit from said corresponding bit input signal and said received ripple borrow signal;
   a most significant bit half adder circuit connected to a most significant bit input terminal of said decrementer stage for receiving a most significant bit input signal and receiving a ripple borrow signal from a prior half adder circuit, said most significant half adder circuit having a sum circuit connected to a corresponding output terminal for forming an arithmetic sum on said corresponding output terminal from said corresponding bit signal and said received ripple borrow signal, said most significant bit half adder circuit having no ripple carry circuit;
   a borrow look-ahead circuit including
      an inverter having an input connected to said stage borrow terminal and an output,
      a set of N bit inverters, each inverter having an input connected to a corresponding input terminal and an output,
      a NAND gate having N inputs, each input connected to said output of a corresponding bit inverter, and an output,
      a NOR gate having a first input connected to said output of said inverter and a second input connected to said output of said NAND gate and an output connected to said stage borrow output.

10. An N bit prioritizer circuit comprising:
a set of N first input terminals, each first input terminal receiving a corresponding bit signal of an N bit number to be prioritized;
a set of N second input terminals, each second input terminal receiving a corresponding bit signal of an N bit mask;
a carry input terminal for receiving a carry input signal to a least significant bit of said N bit number to be prioritized;
a set of N output terminals, each input terminal generating a corresponding prioritized bit of said N bit number to be prioritized;
a carry output terminal for generating a carry output signal from a most significant bit of said N bit number to be prioritized;
a set of N−1 half adder circuits, one half adder circuit for each bit of said N bit number to be prioritized except for said most significant bit, each half adder circuit connected to corresponding first and second input terminals and receiving a ripple carry signal, a least significant half adder circuit connected to said carry input terminal for receiving a ripple carry signal, each other half adder circuit connected to a prior half adder circuit for receiving a ripple carry signal from said prior half adder circuit, each half adder circuit including a NAND gate having a first input connected to a corresponding first input terminal and a second input connected to a corresponding second input terminal, a priority circuit connected to a corresponding output terminal for forming a priority output signal on said corresponding output terminal from said output of said NAND gate and said received ripple carry signal, a ripple carry circuit connected to said output of said NAND gate for forming a ripple carry signal for supply to a next half adder circuit from said output of said NAND gate and said received ripple carry signal;

a most significant bit half adder circuit connected to a most significant bit input terminal for receiving a said output of a corresponding most significant bit NAND gate and receiving a ripple carry signal from a prior half adder circuit, said most significant half adder circuit including a priority circuit connected to a corresponding output terminal for forming a priority output signal on said corresponding output terminal from said output of said corresponding most significant bit NAND gate and said received ripple carry signal, said most significant bit half adder circuit having no ripple carry circuit;

a carry look-ahead circuit including
an inverter having an input connected to said carry input terminal and an output,
a carry look-ahead NAND gate having N inputs, each input connected to said output of a corresponding NAND gate, and an output
a NOR gate having a first input connected to said output of said inverter and a second input connected to said output of said carry look-ahead NAND gate and an output connected to said carry output terminal.

11. An N bit prioritizer circuit comprising:

a set of N first input terminals, each first input terminal receiving a corresponding bit signal of an N bit number to be prioritized;

a set of N second input terminals, each second input terminal receiving a corresponding bit signal of an N bit mask;

a carry input terminal for receiving a carry input signal to a least significant bit of said N bit number to be prioritized;

a set of N output terminals, each output terminal generating a corresponding prioritized bit of said N bit number to be prioritized;

a carry output terminal for generating a carry output signal from a most significant bit of said N bit number to be prioritized;

a plurality of prioritizer stages, each prioritizer stage having M bits where M<N, each prioritizer stage connected to corresponding first and second input terminals and said output terminals and having a stage carry input and a stage carry output, said stage carry input of a least significant prioritizer stage connected to said carry input terminal, said stage carry input of other prioritizer stages connected to said stage carry output of a prior prioritizer stage and said stage carry output of a most significant prioritizer stage connected to said carry output terminal, each prioritizer stage including a set of M−1 half adder circuits, one half adder circuit for each corresponding bit of said N bit number to be prioritized except for a most significant bit of said prioritizer stage, each half adder circuit connected to corresponding first and second input terminals and receiving a ripple carry signal, a least significant half adder circuit of each prioritizer stage connected to said stage carry input for receiving a ripple carry signal, each other half adder circuit connected to a prior half adder circuit for receiving a ripple carry signal from said prior half adder circuit, each half adder circuit having a NAND gate having a first input connected to a corresponding first input terminal and a second input connected to a corresponding second input terminal, a priority circuit connected to a corresponding output terminal for forming a priority output signal on said corresponding output terminal from said output of a corresponding NAND gate and said received ripple carry signal, a ripple carry circuit connected to said output of a corresponding NAND gate for forming a ripple carry signal for supply to a next half adder circuit from said output of said corresponding NAND gate and said received ripple carry signal;

a most significant bit half adder circuit connected to a most significant bit input terminal of said prioritizer stage for receiving a most significant bit input signal and receiving a ripple carry signal from a prior half adder circuit, said most significant half adder circuit having a priority circuit connected to a corresponding output terminal for forming a priority signal on said corresponding output terminal from said output of said corresponding NAND gate and said received ripple carry signal, said most significant bit half adder circuit having no ripple carry circuit;

a carry look-ahead circuit having
an inverter having an input connected to said stage carry terminal and an output,
a carry look-ahead NAND gate having N inputs, each input connected to corresponding first and second input terminals of said prioritizer stage, and an output
a NOR gate having a first input connected to said output of said inverter and a second input connected to said output of said carry look-ahead NAND gate and an output connected to said stage carry output.

12. A computer system comprising:

a memory for storing program instructions including instructions for servicing a plurality of interrupts at predetermined vector addresses;

a processor coupled to said memory for executing program instructions recalled from said memory, said processor including a program counter having stored therein an address for a next instruction to be recalled from said memory, an interrupt flag register having stored therein an N bit data word indicating active interrupts, an interrupt mask register having stored therein an N bit data word indicating interrupts that are masked, an interrupt prioritizer connected to said program counter, said interrupt flag register and said interrupt mask register for indicating recognized interrupts, said interrupt prioritizer having a set of N first input terminals, each first input terminal connected to a corresponding bit of said interrupt flag register, a set of N second input terminals, each second input terminal connected to a corresponding bit of said interrupt mask register, a carry input terminal for receiving a carry input signal to a least significant bit of said N bit number to be prioritized, a set of N output terminals, each output terminal generating an indication of recognition of corresponding interrupt, a carry output terminal for generating a carry output signal from a most significant bit of said N bit data word, a plurality of prioritizer stages, each prioritizer stage having M bits where $M<N$, each prioritizer stage connected to corresponding first and second input terminals and said output terminals and having a stage carry input and a stage carry output, said stage carry input of a least significant prioritizer stage connected to said carry input terminal, said stage carry input of other prioritizer stages connected to said stage carry output of a prior prioritizer stage and said stage carry output of a most significant prioritizer stage connected to said carry output terminal, each prioritizer stage including a set of $M-1$ half adder circuits, one half adder circuit for each corresponding bit of said N bit data word except for a most significant bit of said prioritizer stage, each half adder circuit connected to corresponding first and second input terminals and receiving a ripple carry signal, a least significant half adder circuit of each prioritizer stage connected to said stage carry input for receiving a ripple carry signal, each other half adder circuit connected to a prior half adder circuit for receiving a ripple carry signal from said prior half adder circuit, each half adder circuit having a NAND gate having a first input connected to a corresponding first input terminal and a second input connected to a corresponding second input terminal, a priority circuit connected to a corresponding output terminal for forming a priority output on said corresponding output terminal from said output of a corresponding NAND gate and said received ripple carry signal, a ripple carry circuit connected to said output of a corresponding NAND gate for forming a ripple carry signal for supply to a next half adder circuit from said output of said corresponding NAND gate and said received ripple carry signal, a most significant bit half adder circuit connected to a most significant bit input terminal of said prioritizer stage for receiving a most significant bit input signal and receiving a ripple carry signal from a prior half adder circuit, said most significant half adder circuit having a priority circuit connected to a corresponding output terminal for forming a priority signal on said corresponding output terminal from said output of said corresponding NAND gate and said received ripple carry signal, said most significant bit half adder circuit having no ripple carry circuit, a carry look-ahead circuit having an inverter having an input connected to said stage carry terminal and an output, a carry look-ahead NAND gate having N inputs, each input connected to corresponding first and second input terminals of said prioritizer stage, and an output a NOR gate having a first input connected to said output of said inverter and a second input connected to said output of said carry look-ahead NAND gate and an output connected to said stage carry output, and an interrupt vector generator for forming an interrupt service address corresponding to said recognized interrupt.

* * * * *